(12) United States Patent  (10) Patent No.: US 6,705,782 B2
Cheng                      (45) Date of Patent:     Mar. 16, 2004

(54) KEYBOARD FOR COMPUTER SYSTEM

(75) Inventor: Tsai Ching Cheng, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 10/026,601

(22) Filed: Dec. 27, 2001

(65) Prior Publication Data

US 2003/0123916 A1 Jul. 3, 2003

(51) Int. Cl.[7] .................................. B41J 5/16
(52) U.S. Cl. ........................ 400/472; 400/691
(58) Field of Search ................ 400/691, 693, 400/694, 472, 690; 361/680; 235/145 R, 145 A, 146; 345/168, 169; 364/709.12, 189

(56) References Cited

U.S. PATENT DOCUMENTS 4,948,281 A * 8/1990 Werner ...................... 400/472
5,681,122 A * 10/1997 Burke ....................... 400/472
5,810,491 A * 9/1998 Muller et al. ............... 400/496
6,054,939 A * 4/2000 Wei et al. .................... 341/20
6,398,436 B1 * 6/2002 Chao ......................... 400/472

* cited by examiner

Primary Examiner—Anthony H. Nguyen
(74) Attorney, Agent, or Firm—Bacon & Thomas, PLLC

(57) ABSTRACT

A keyboard for a computer includes a bottom board arranged to contain keys, and a sealing layer adhered to the lower surface of the bottom board; wherein the sealing layer is installed with a dividing structure consisted of at least one or more grooves, slits or apertures. The dividing structure is used for breaking up the totality of the sealing layer, so that when the bottom board and the sealing layer are to be adhered integrally via the baking procedure, the condition of distortion therebetween caused by the different thermal expansion coefficients of the two materials due to temperature change is to be prevented, so as to maintain the smoothness of the keyboard, and expedite the assembly process.

9 Claims, 15 Drawing Sheets

KEYBOARD FOR COMPUTER SYSTEM

BACKGROUND OF THE INVENTION

1. Field of the Invention

The present invention relates to a kind of keyboard, more particularly, a kind of keyboard that is used for notebook computers, characterized in that the dividing mechanism of the sealing layer is designed to break up the totality of the sealing layer, thus solving the condition of distortion caused by the different thermal expansion coefficients of the bottom board and the sealing layer adhered thereon due to temperature change, so as to maintain the smoothness of the keyboard, and expedite the assembly process.

2. Description of Related Art

A general notebook computer 10, as shown in FIG. 1, mainly comprises a screen 20, a keyboard 30 and a casing 40; wherein the screen 20 and the casing 40 are integrally connected via the hinge mechanism. The keyboard 30 is installed on the casing 40, wherein a motherboard adhered on the surface with CPU and other electronic units is contained; the motherboard is located under the keyboard 30.

The keyboard 30 is assembled with components including a plurality of keys 31, a bottom board having upturning edges 37, a rubber layer 33 and a circuit board layer 34, assembled as shown in FIG. 2 and FIG. 3, then the assembled keyboard is to be installed on the casing 40.

The composition of the keyboard 30 is to be further elaborated in accordance with FIG. 4 to FIG. 8.

FIG. 4 shows the condition where the sealing layer 38 of the keyboard 30 detaching (not being adhered) from the bottom board 35 containing the key 31, wherein the shape of the sealing layer 38 is largely correspondent to that of the bottom board 35. The sealing layer 38 can be made of soft or hard plastic material. Please continue refer to FIG. 5, which shows that a plurality of apertures 36, formed via the means of pressure-punching, are installed on the bottom board 35 in FIG. 4, and during the process of pressure-punching, lugs are also formed to lock and fix the rubber layer 33 and the circuit board layer 34 (not shown in figures). The bottom board 35 and the sealing layer 38, as shown in FIG. 4 and FIG. 5, are to be adhered together by gluing on the lower surface of the bottom board 35 or on the upper surface of the sealing layer 38, thus the sealing layer 38 is to be adhered to the lower surface of the bottom board 35, as shown in FIG. 6. The baking procedure is to be executed on the keyboard 30 that includes the sealing layer 38, for the glue between the sealing layer 38 and the bottom board 35 has to be solidified to closely adhere the two; the keyboard 30 after the baking procedure is shown in FIG. 2. Through the cross-sectional views of FIG. 7 and FIG. 8, it is to be thoroughly understood that the keyboard 30 mainly includes the keys 31, rubber layer 33, circuit board layer 34, bottom board 35 and the sealing layer 38. Since the composition of the keyboard 30 is of conventional art, it is no need to describe the detailed structure thereof here.

The notebook computer 10 (please refer to FIG. 1), with the convenient features of lighter weight and smaller volume, thus easy to be carried around, demands higher price than that of desktop computers. In order to avoid the situation that the expensive notebook computer being easily damaged when the user, while operating the notebook computer, accidentally pours liquid onto the keyboard 30, the conventional keyboard 30 is installed with the sealing layer 38 on the lower surface of the bottom board 35, therefore making the keyboard 30 a waterproof keyboard, for the purpose of stopping the liquid poured in from flowing through the apertures 36 of the bottom board 35 down to the circuit board. By using the sealing layer 38 to seal the apertures 36 of the bottom board 35, it is to be assured that the circuit board is not to be damaged by the liquid dripping down from the apertures 36 of the bottom board 35, and the normal operation of the notebook computer is to be maintained.

The bottom board 35 that contains the keys 31, since it is designed to receive the force from the user's pushing the keys 31, should be made of rigid and durable material, like metal, so as to prevent the keyboard 30 from being distorted and deformed; as to the sealing layer 38, it should especially be made of lamellar waterproofing material, thus not to increase the overall thickness.

However, because glue is used for adhering the sealing layer 38 onto the lower surface of the bottom board 35, with the sizes of the sealing layer 38 and the bottom board 35 being at least 10 cm×27 cm, the different thermal expansion coefficients for both materials, after being through the baking procedure, are to cause distortion due to the temperature change, as shown in FIG. 9, wherein it is different from the horizontal smoothness of the bottom board shown by FIG. 7. Thus a height difference D emerges between the upturned edges of the keyboard 30 and the horizontal line 32 parallel to the bottom board 35. The distorted keyboard 30 is of a flawed product that may adversely affect the precision during assembly, thus causing difficulty during assembly.

SUMMARY OF THE INVENTION

The object of the present invention is to provide a kind of keyboard for notebook computers, mainly by using the dividing mechanism of the sealing layer to break up the totality of the sealing layer, thus solving the distortion caused by different thermal expansion coefficients of the bottom board and the sealing layer adhered thereon due to temperature change, so as to maintain the smoothness of the keyboard and expedite the assembly process.

To achieve the above mentioned object, the keyboard of the present invention at least includes a bottom board, installed with a plurality of apertures, that contains keys, and a sealing layer adhered to the lower surface of the bottom board; at least one dividing means, which may be a mechanism or, without limitation, a structure such as a groove, aperture, or slit, being installed on the sealing layer, with the dividing means being installed between the apertures so as to avoid the locations of the apertures installed on the bottom board and thereby maintain the aperture seals.

Preferably, the sealing layer consists of one layer in the form of a lamella, the dividing means installed thereon being in the form of apertures or grooves.

Alternatively, the sealing layer may consist of at least two layers in the form of lamellas, the dividing means installed thereon being in the form of slits.

The shapes of the apertures, grooves or slits in the dividing mechanism are not to be restricted.

The structure of the dividing means is not to be restricted.

BRIEF DESCRIPTION OF THE DRAWINGS

These and other features, aspects and advantages of the present invention will become better understood with regard to the following description, appended claims and accompanying drawings that are provided only for further elaboration without limiting or restricting the present invention, where:

DETAILED DESCRIPTION OF THE PREFERRED EMBODIMENT

Please refer to the embodiments of the present invention shown from FIG. 10 to FIG. 15, figures that are all bottom plan views of the keyboard 50 of the present invention. The structure of the keyboard 50 of the present invention, except the sealing layer 60, is identical to the conventional keyboard 30 shown from FIG. 1 to FIG. 9.

Figure 1:
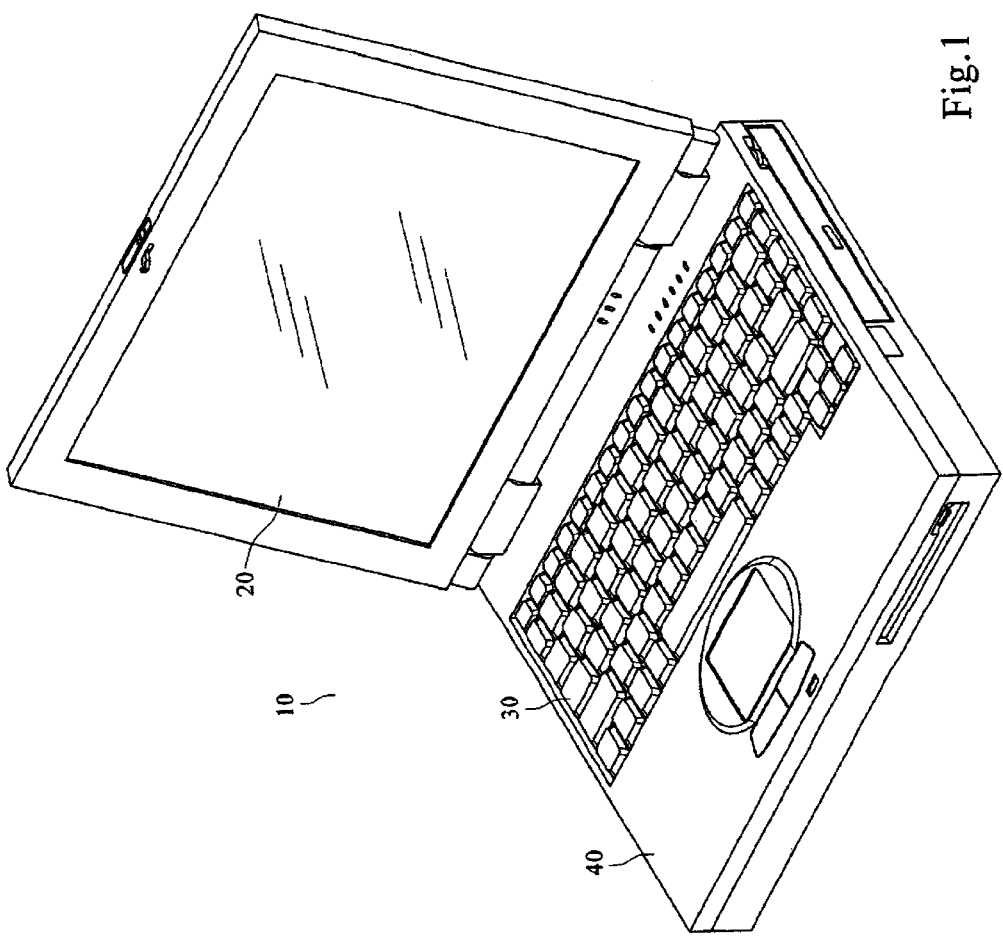
FIG. 1 shows a perspective view of a notebook computer under the opened status.
Figure 2:
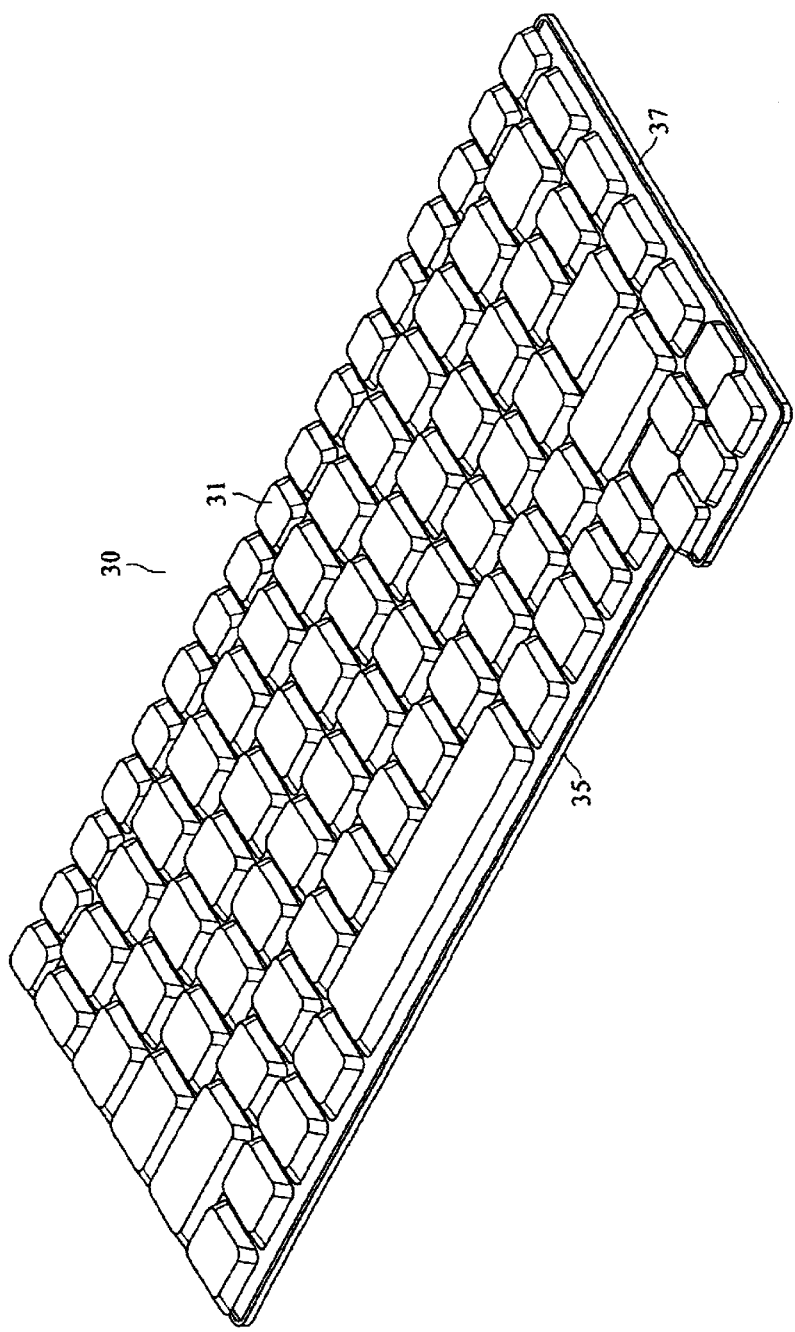
FIG. 2 shows a perspective view of a conventional keyboard in a notebook computer shown in FIG. 1.
Figure 3:
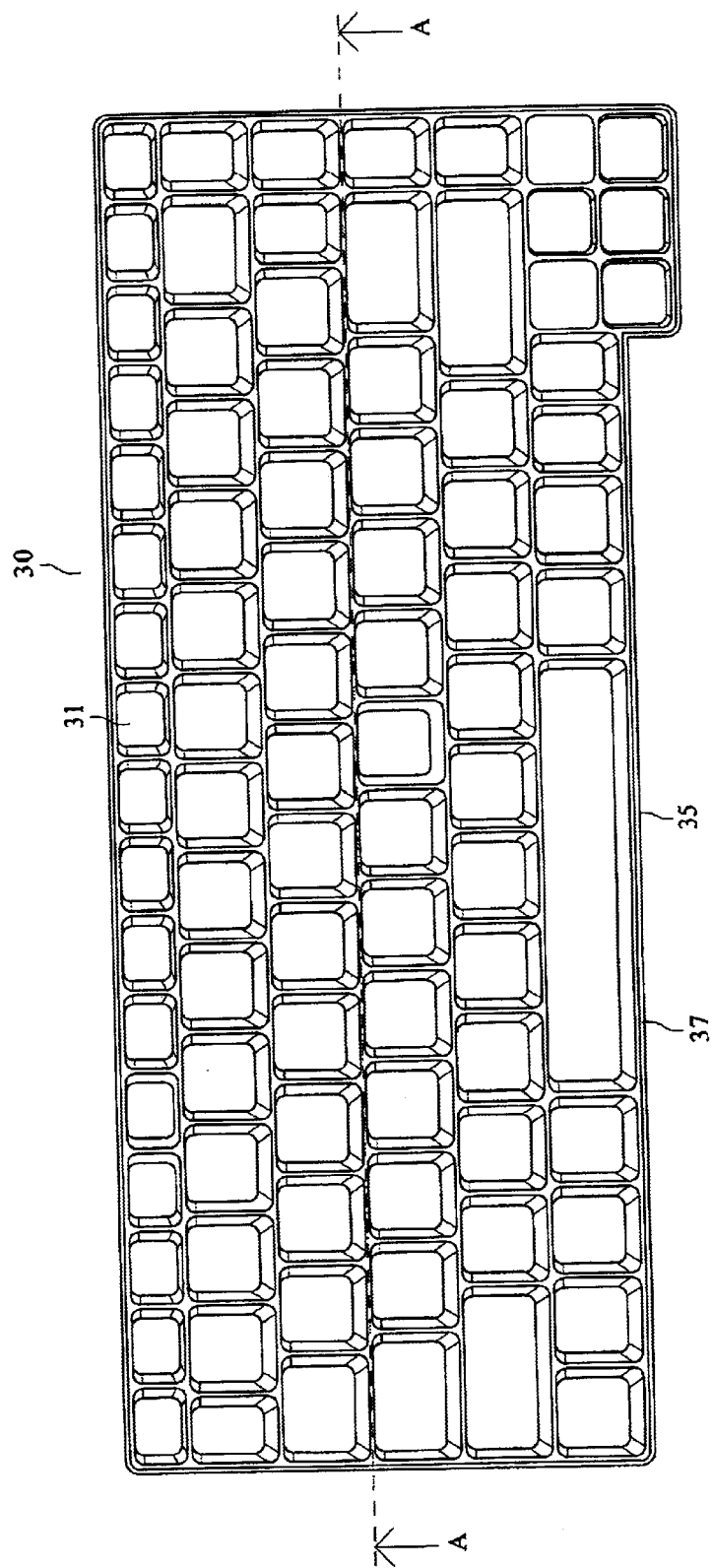
FIG. 3 shows a top plan view of the keyboard shown in FIG. 2.
Figure 4:
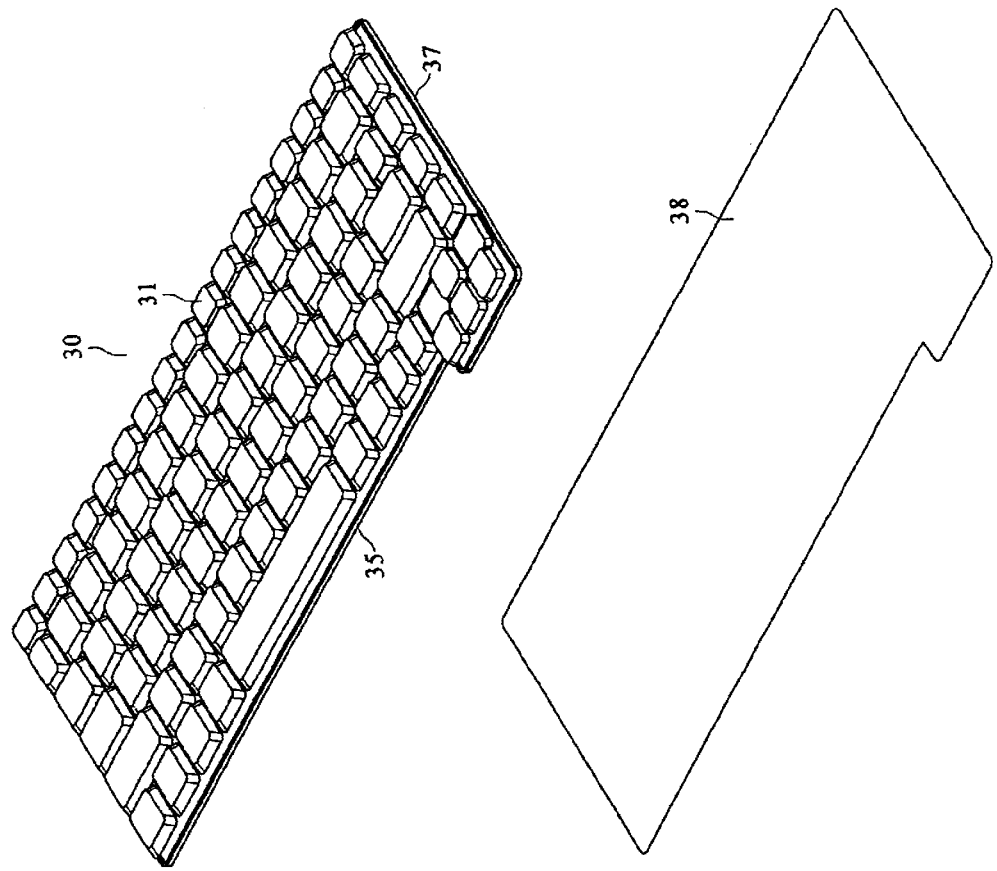
FIG. 4 shows a divisional perspective view of the sealing layer detaching from the bottom board of the keyboard.
Figure 5:
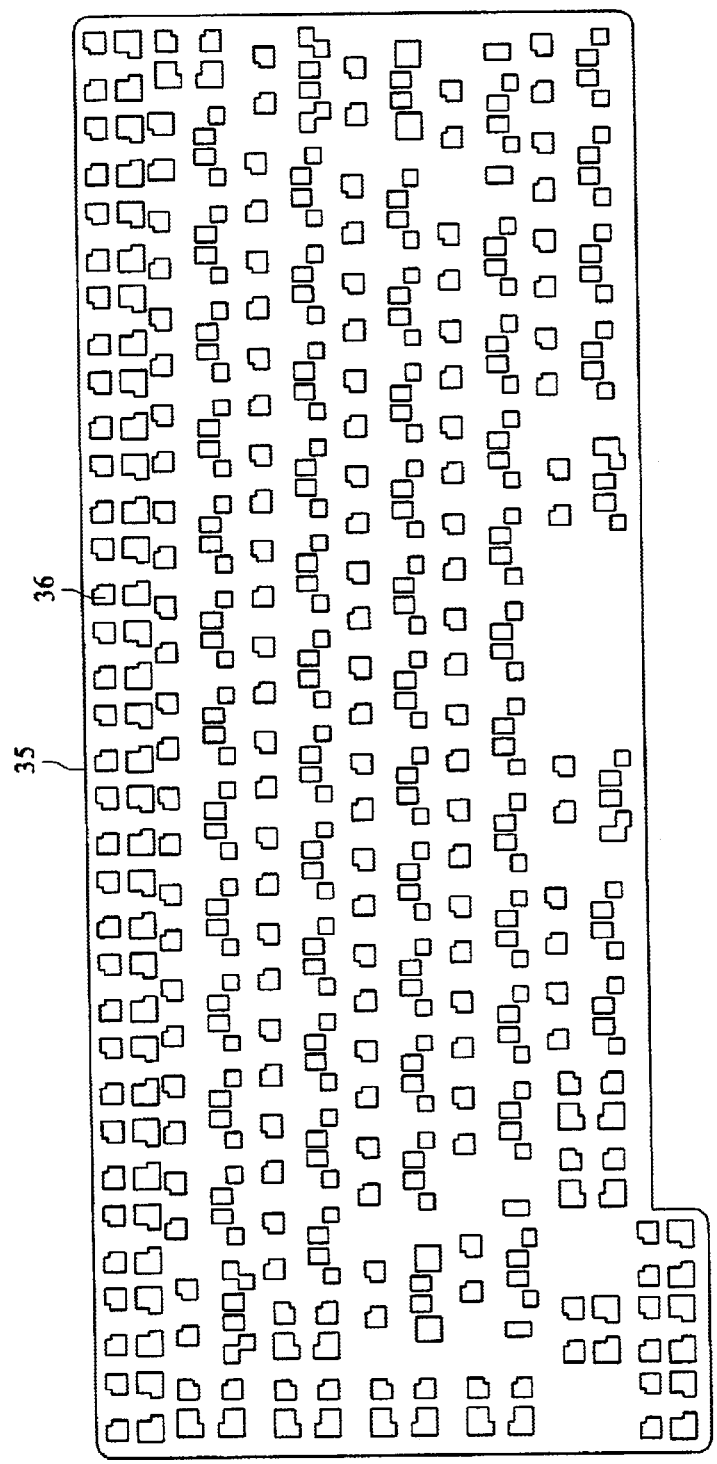
FIG. 5 shows a bottom plan view of the bottom board of the keyboard shown in FIG. 4.
Figure 6:
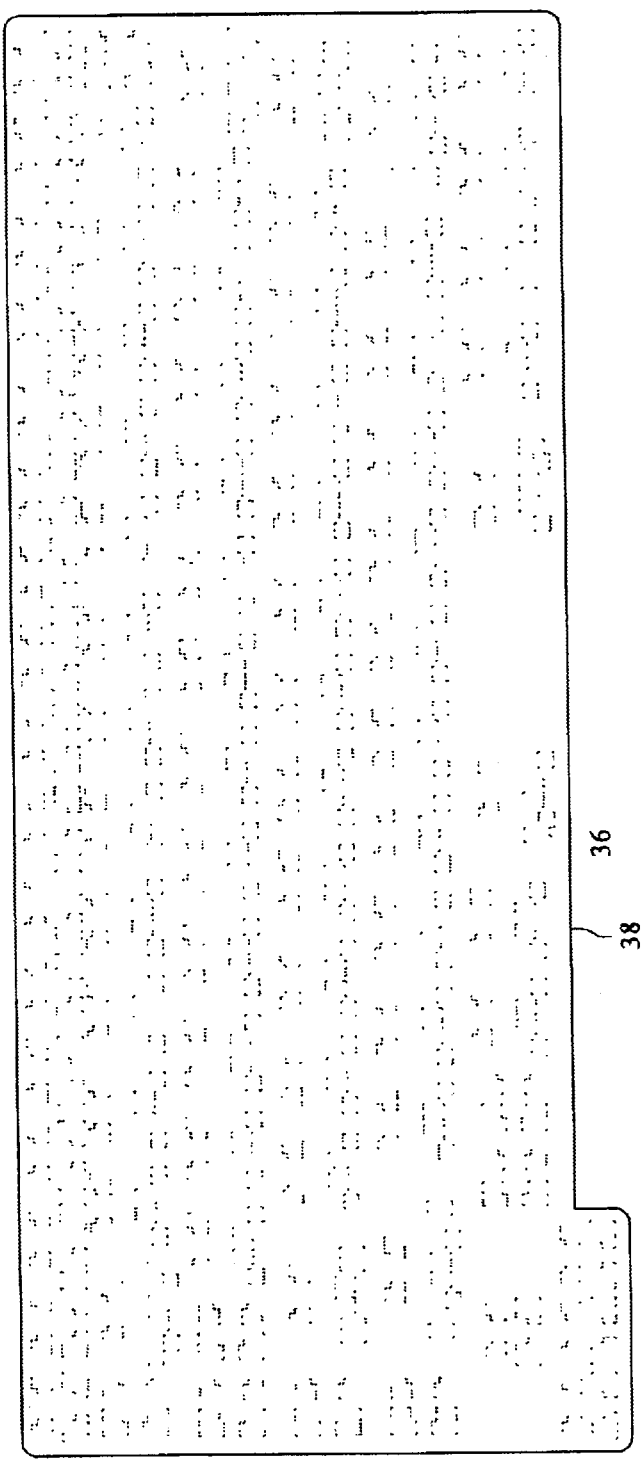
FIG. 6 shows a bottom plan view of the sealing layer adhering to the bottom board of the keyboard.
Figure 7:
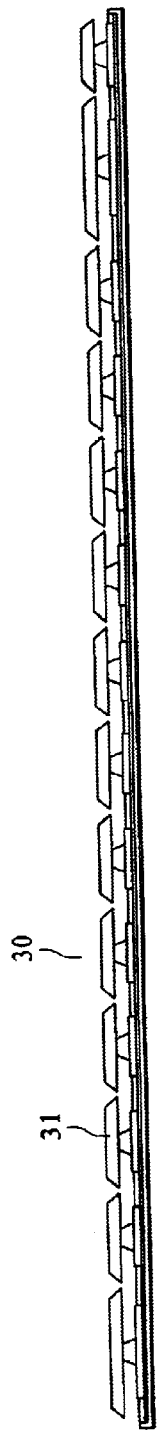
FIG. 7 shows a cross sectional structural view of the line A—A in FIG. 3.
Figure 8:
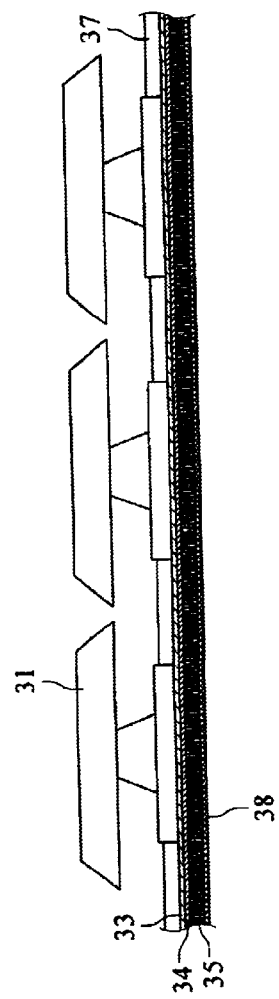
FIG. 8 shows an enlarged partial structural view of FIG. 7.
Figure 9:
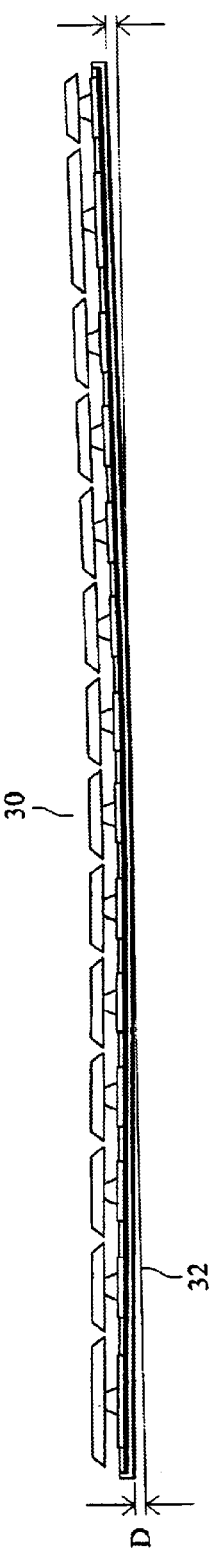
FIG. 9 shows the distortion of a conventional keyboard being through the baking procedure.
Figure 10:
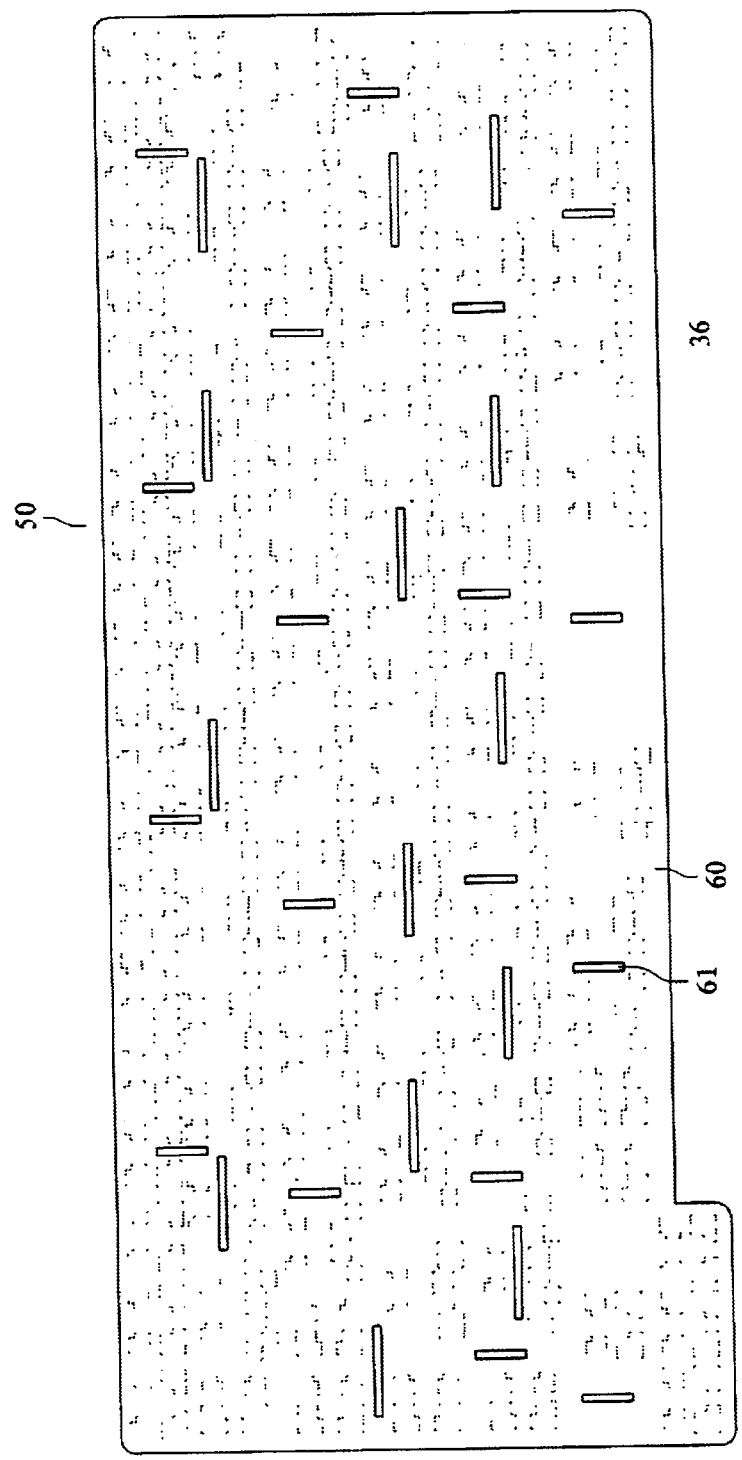
FIG. 10 shows the first embodiment of the present invention.

What the first embodiment of the present invention discloses, as shown in FIG. 10, is the keyboard 50 of the present invention with the lower surface thereof adhered to the sealing layer 60, which is installed with a proper amount of dividing means in the form of mechanisms or structures that, with regular or irregular installing lengths (or widths), are horizontally and vertically oriented on proper distribution area, like the sealing groove 61; in addition, each sealing groove 61 is installed to avoid, i.e., extends between, the apertures 36 of the bottom board.

The sealing layer 60 is adhered to the lower surface of the bottom board 35 by using the conventional technology and closely jointed with the bottom board 35 after the baking procedure. With the installment of the dividing means (also referred to herein as a mechanism), the totality of the sealing layer 60 is broken up, thus the distortion therebetween caused by the different thermal expansion coefficients of the two materials due to temperature change is to be prevented, so as to maintain the smoothness of the keyboard, and expedite the assembly process.

Figure 11:
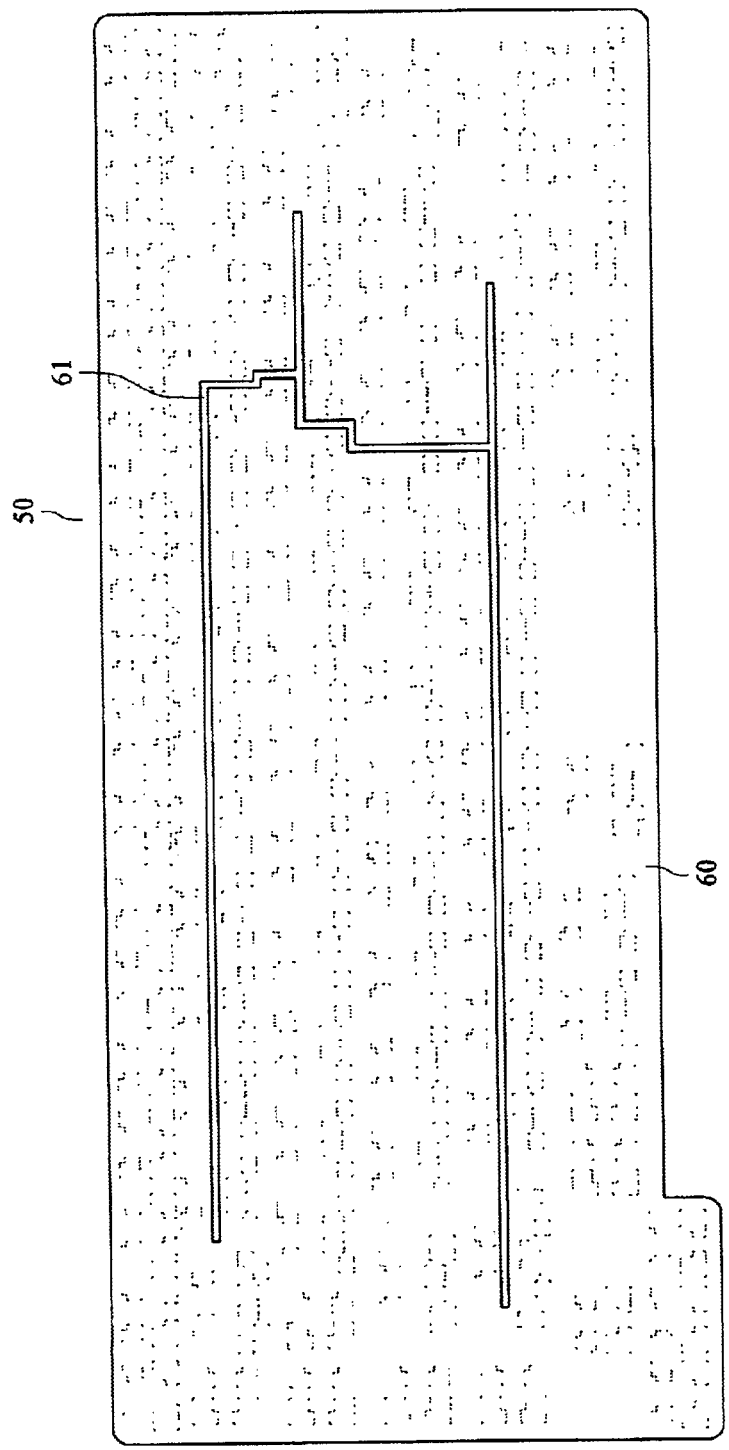
FIG. 11 shows the second embodiment of the present invention.

What the second embodiment of the present invention in FIG. 11 discloses is the sealing groove 61 that is connected and bifurcated with proper extension length and proper distribution area, a dividing mechanism that breaks up the totality of the sealing layer 60, thus having the same effect of the embodiment shown in FIG. 10.

Figure 12:
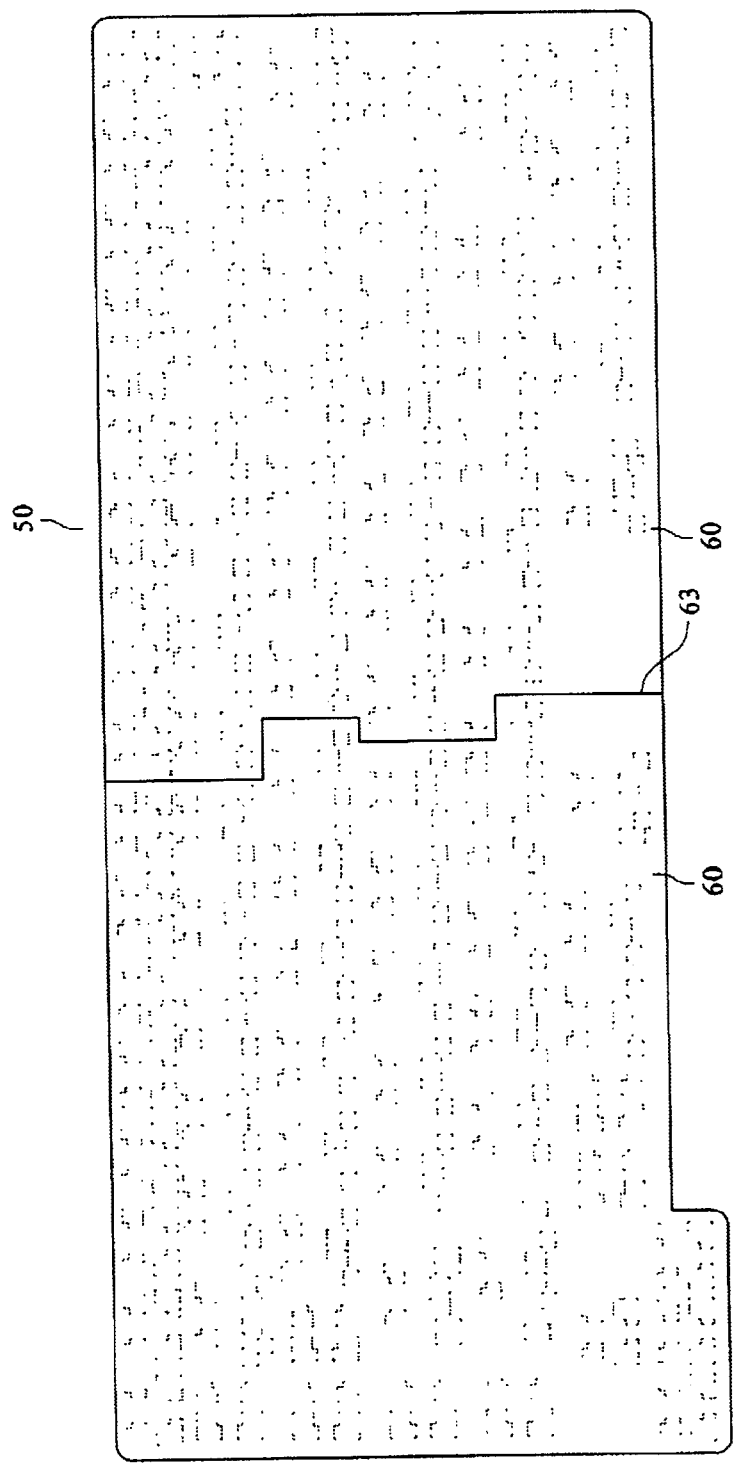
FIG. 12 shows the third embodiment of the present invention.

What the third embodiment of the present invention in FIG. 12 discloses is the lower surface of the bottom board of the keyboard 50, whereon the sealing layers 60 and 60 are independently adhered, and the dividing mechanism is formed by closely jointing the adjacent area between the two sealing layers 60 and 60, like the slight slit 63; this design can also break up the totality of the sealing layer, thus having the same effect of the embodiment shown in FIG. 10.

Figure 13:
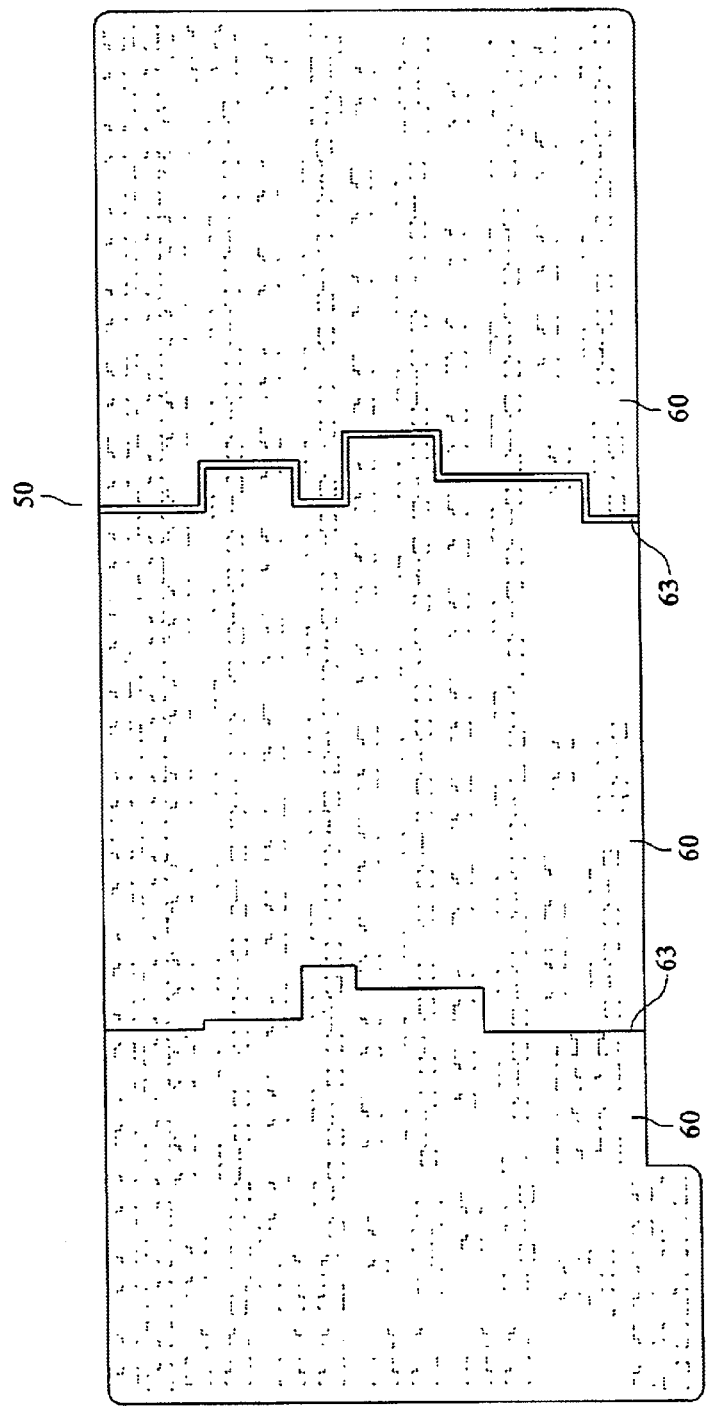
FIG. 13 shows the fourth embodiment of the present invention.

What the fourth embodiment of the present invention in FIG. 13 discloses is the lower surface of the bottom board of the keyboard 50, whereon three sealing layers 60, 60 and 60 are independently adhered respectively. The dividing mechanism is formed where a slight slit 63, as shown in FIG. 12, is formed by closely jointing the adjacent area of the two sealing layers 60 and 60 on the left, and where a gap is formed on the adjacent area of the two sealing layers 60 and 60 on the right, like the gap 63 with larger slit; this design can also break up the totality of the sealing layer, thus having the same effect of the embodiment shown in FIG. 10.

Figure 14:
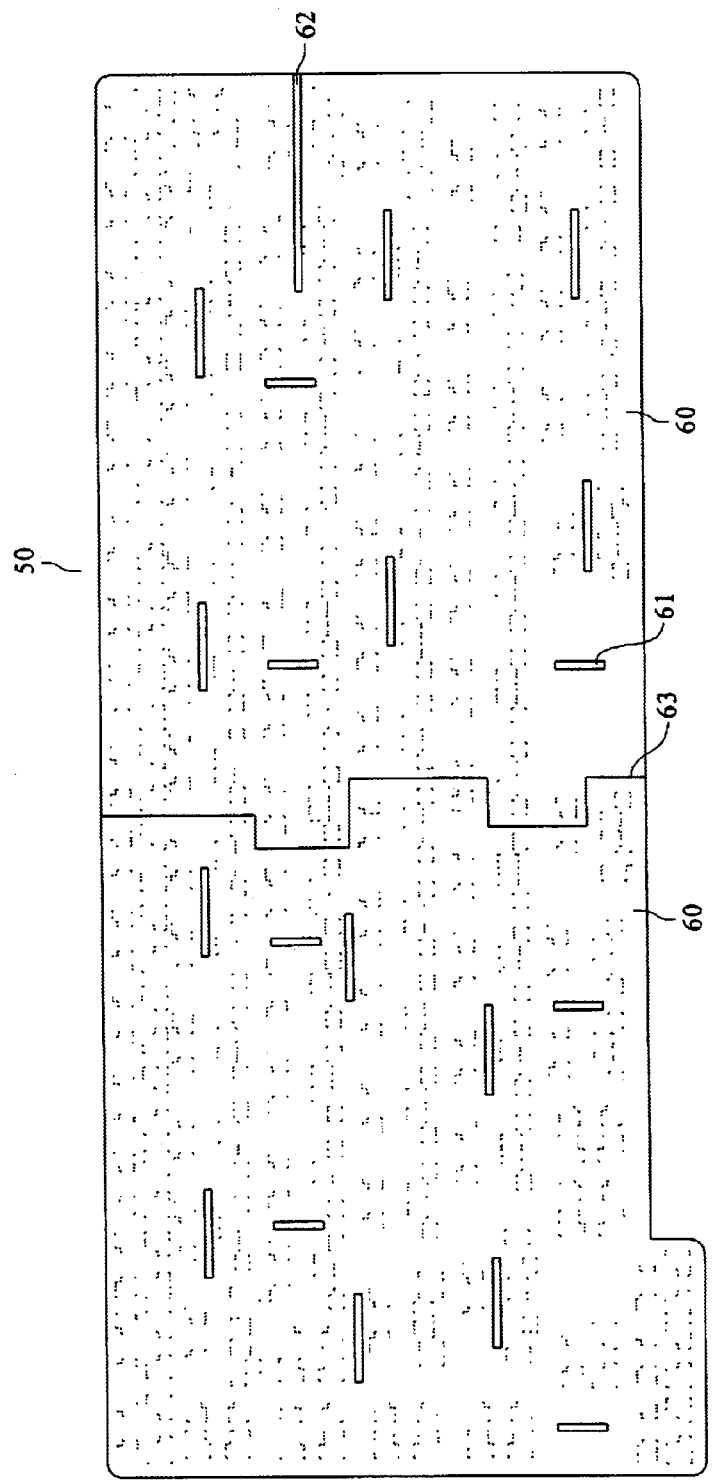
FIG. 14 shows the fifth embodiment of the present invention.

What the fifth embodiment of the present invention in FIG. 14 discloses, which is the combination of embodiments in FIG. 10 and FIG. 12, is the lower surface of the bottom board of the keyboard 50, whereon two sealing layers 60 and 60 are independently adhered respectively, and the overall dividing mechanism is formed by closely jointing the adjacent area between the two sealing layers 60 and 60, like the slight slit 63. Also, the two sealing layer 60 and 60 are respectively installed with proper amount of dividing mechanisms that, with regular or irregular installing lengths (or widths), are horizontally and vertically oriented on proper distribution area, like the sealing groove 61; in addition, the sealing layer 60 on the right is further installed with an open groove 62 that closes at one end and extends to the edge of the sealing layer 60 with the other end opened; this design can also break up the totality of the sealing layer, thus having the same effect of the embodiment shown in FIG. 10.

Figure 15:
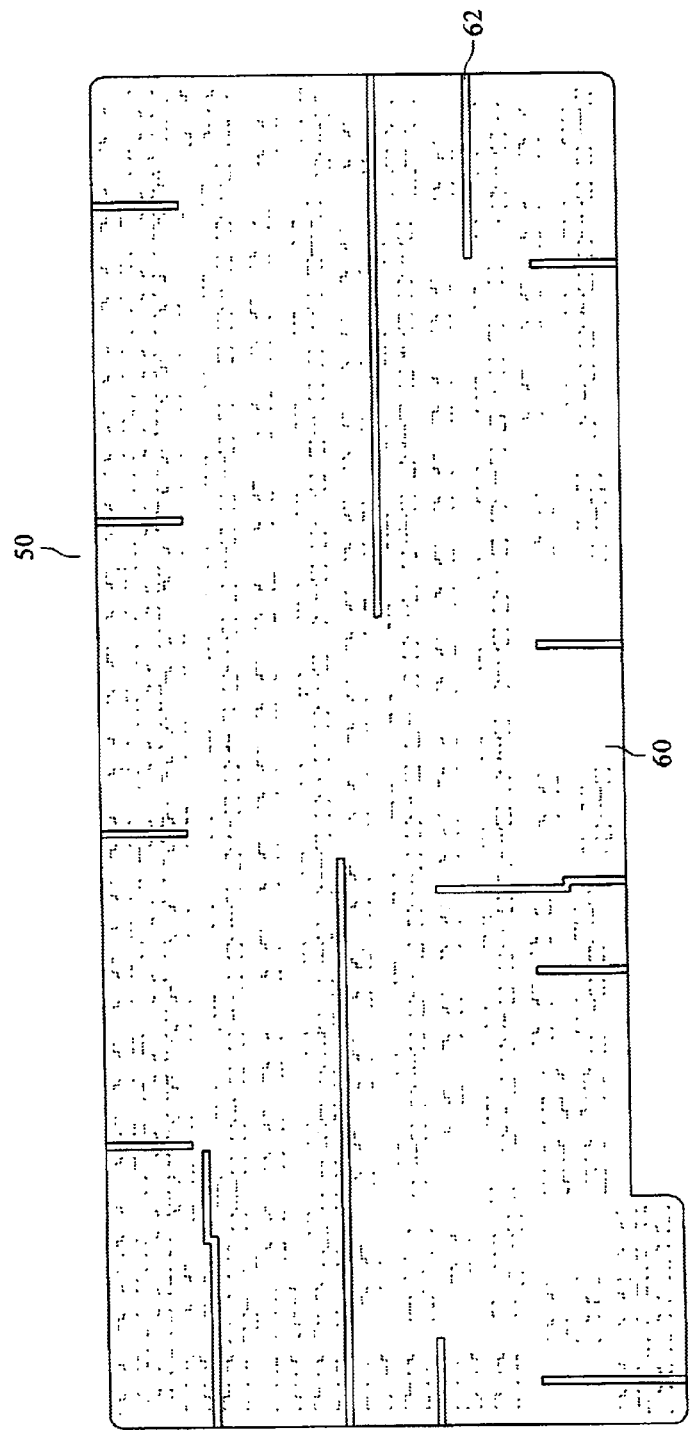
FIG. 15 shows the sixth embodiment of the present invention.

What the sixth embodiment of the present invention in FIG. 15 discloses is the lower surface of the bottom board of the keyboard 50, whereon a sealing layers 60 is adhered, and the sealing layer 60 is installed with proper amount of dividing mechanisms that, with regular or irregular installing lengths (or widths), are horizontally and vertically oriented on proper distribution area and are all having closed ends and an open end which are formed from extending the dividing mechanisms to the edges of the sealing layer 60, like the open groove 62; this design can also break up the totality of the sealing layer, thus having the same effect of the embodiment shown in FIG. 10.

The aforementioned closed groove 61 can also be called apertures or other terms having identical compositions; the aforementioned open groove 62 can also be called indented groove, concave portion or other terms having identical compositions.

Figure 16:
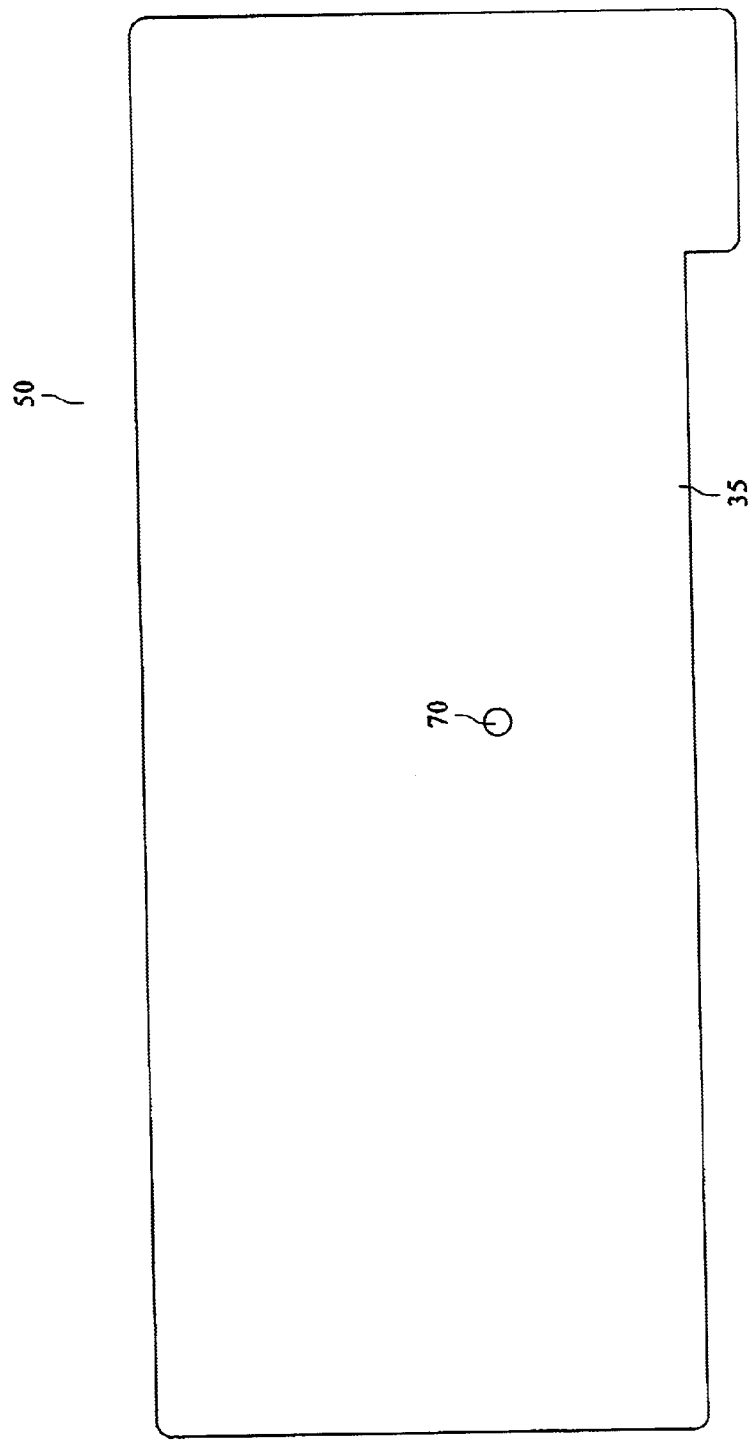
FIG. 16 shows another embodiment of the present invention, wherein a bottom board of a keyboard having water-draining function is shown.

What FIG. 16 shows is a bottom plan view of the bottom board 35 of the keyboard 50 having the water-draining function (the apertures 36 of the bottom board are not shown; please refer to other figures), wherein it is shown that the bottom board 35 is installed with a draining hole 70 for draining liquid accumulated on the bottom board 35 out of the notebook computer. The sealing layer 60 of the present invention can be applied on the keyboard 50 having water-draining function only by avoiding the draining hole and apertures of the bottom board when installing the dividing mechanism, thus still able to achieve the goal of preventing the condition of distortion therebetween caused by the different thermal expansion coefficients of the two materials.

Although the present invention has been described in considerable detail with reference to certain preferred embodiments thereof, those skilled in the art can easily understand that all kinds of alterations and changes can be made within the spirit and scope of the appended claims. Therefore, the spirit and scope of the appended claims should not be limited to the description of the preferred embodiments contained herein.

What is claimed is:

1. A keyboard for a computer system, at least comprising:
    a bottom board having a plurality of apertures for containing keys; and
    a sealing layer adhered to the lower surface of said bottom board for preventing liquid from flowing through said apertures; said sealing layer including at least one dividing means for dividing said sealing area so as to prevent differences in coefficient of thermal expansion between said sealing layer and said bottom board from causing distortion of said keyboard,
    wherein said dividing means extends between said apertures to avoid affecting sealing of the apertures by the sealing layer.

2. A keyboard for a computer system as in claim 1, wherein said dividing means is a closed groove.

3. A keyboard for a computer system as in claim 1, wherein said dividing means is an open groove.

4. A keyboard for a computer system as in claim 1, wherein said dividing means is a combination of a closed and an open groove.

5. A keyboard for a computer system as in claim 1, wherein said sealing layer is a lamella.

6. A keyboard for a computer system as in claim 1, wherein said sealing layer includes at least two lamellas, and a slit is formed, by avoiding said apertures of said bottom board, in the adjacent area between said two lamellas.

7. A keyboard for a computer system as in claim 6, wherein said dividing means is of an open groove.

8. A keyboard for a computer system as in claim 6, wherein said dividing means is a closed groove.

9. A keyboard for a computer system as in claim 6, wherein said dividing means is a combination of a closed and open groove.

* * * * *